June 25, 1968 P. DE HERTEL EASTCOTT 3,389,871
FLUID REGULATING SYSTEM
Filed Nov. 16, 1966
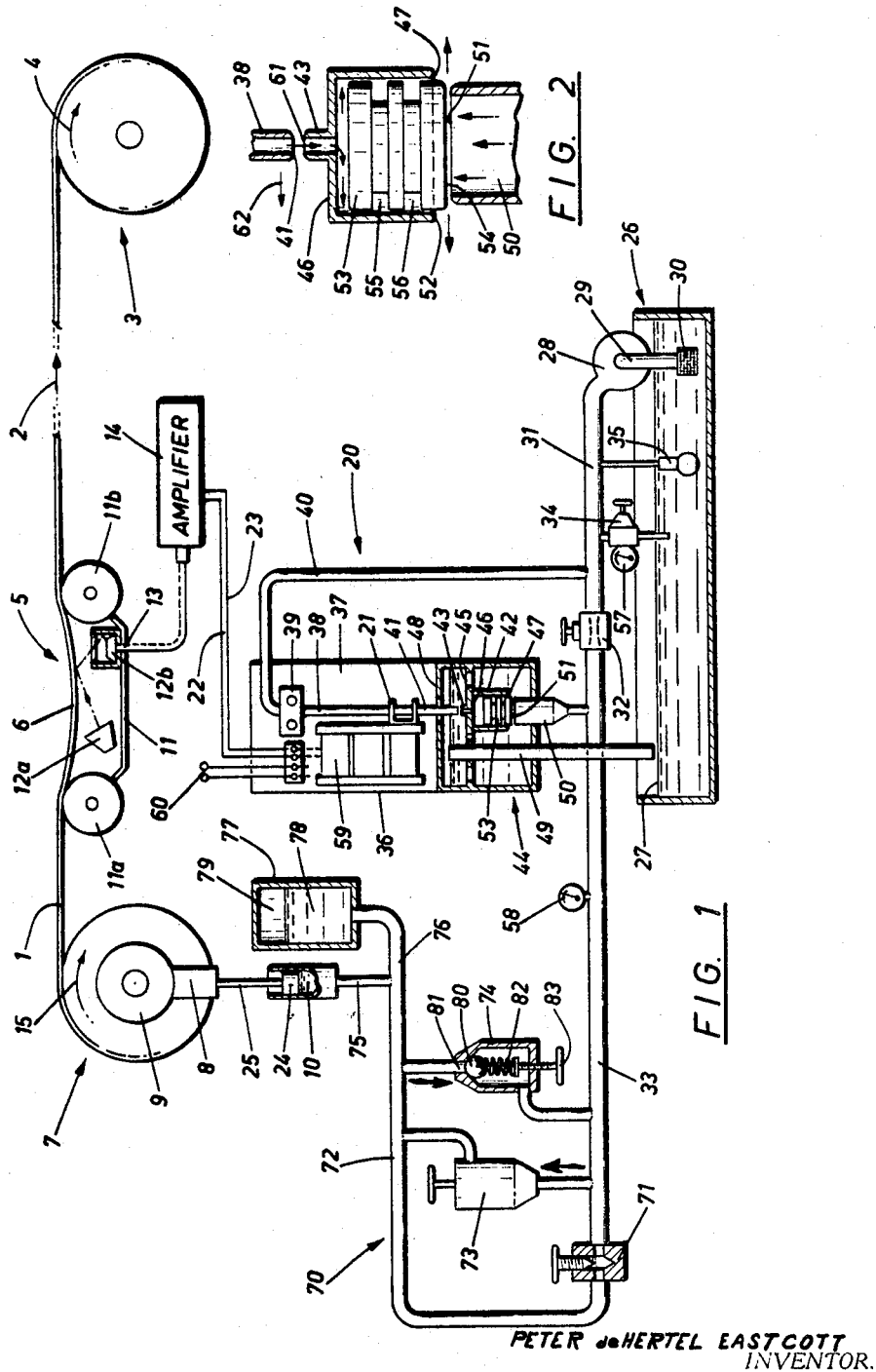
PETER de HERTEL EASTCOTT
INVENTOR.
BY R. A. Eckersley
PATENT AGENT 3,389,871
FLUID REGULATING SYSTEM
Peter de Hertel Eastcott, Peterborough, Ontario, Canada, assignor to Canadian General Electric Company Limited, Toronto, Ontario, Canada, a corporation of Canada
Filed Nov. 16, 1966, Ser. No. 594,804
Claims priority, application Canada, Dec. 11, 1965, 947,556
6 Claims. (Cl. 242—75.44)

This invention relates to fluid systems, which perform mechanical work and in particular to the equipment used for regulating the pressure of the working fluid.

Closed loop fluid regulating systems, as for example, hydraulic and pneumatic systems, are used extensively in industry for many purposes where relatively large forces must be developed. These forces can be readily controlled by means of a fluid regulator which in response to small control signals regulates the pressure of the fluid supplied to the actuator; the magnitude of the control signal represents the force that the actuator is called upon to deliver at any given time. A closed loop system of this kind can be designed for very stable operation by simply making one of the time constants relatively great. A stable system free from hunting is, of course, very desirable, but stability often leads to sluggishness. Sluggishness can be readily tolerated so long as the operation of the system is normal; however, there are times when fast response is wanted, as for example, during start-up or shut-down of the system, and in particular during an emergency shutdown.

In the practice of this invention a stable fluid system employing an actuator and a regulator includes means for increasing the speed of response during abnormal operating conditions such as during starting or stopping of the system. This is accomplished by placing a bidirectional flow restricting valve between the regulator and the actuator and by-passing this valve with a pair of normally closed relief valves connected in parallel such that one valve opens at a set pressure to allow fluid to flow freely around the restricting valve in one direction and the other valve opens at a set pressure to allow fluid to flow freely around the restricting valve in the other direction. The restricting valve is set for a rate of flow low enough that the system is stable during normal operation; this rate is much lower than that of the bypass when a relief valve is open. When the regulator now calls on the actuator for fast action, but the flow of fluid to the actuator is held back by the restricting valve, the increase in differential pressure across the restricting valve causes the appropriate relief valve to open, allowing the fluid to flow freely from the regulator to the actuator. Conversely, a sudden decrease of the fluid at the regulator causes the other relief valve to open, allowing the fluid to flow freely from the actuator to the regulator. Hence, under transient conditions, the use of a flow restricting valve bypassed by a pair of relief valves in this way increases greatly the response rate of an otherwise sluggish system without impairing stability during normal operation.

While the specification concludes with claims particularly pointing out and distinctly claiming the subject matter regarded as the invention, it is believed the invention will be better understood from the following description taken in connection with the accompanying drawings, in which:

FIGURE 1 is a diagram showing a hydraulic regulating scheme in a web handling system for control thereof; and FIGURE 2 is an enlargement of a portion of FIGURE 1 showing some of the main elements of the regulator in more detail.

Either a liquid or a gas may be used as the working fluid in the practice of this invention. The apparatus using a liquid will, of course, differ somewhat from the apparatus using a gas because the two fluids have different properties. The properties of both are well enough known that the disclosure of apparatus using one of the fluids will readily suggest to a person skilled in the art apparatus suitable for use with the other fluid. Therefore, only one of the two will be described, and that will be the apparatus using a hydraulic fluid, in this case water.

In FIGURE 1, a hydraulic regulating scheme is shown in a web handling system for controlling the braking force applied by a brake shoe 8 to a brake drum 9 on a roll 7 of web material such as paper. The web 1 is drawn from roll 7 against the retarding force of the brake by means of a driven roll 3 onto which it is wound; arrow 2 indicates the direction the web travels and arrows 15 and 4 the direction rolls 7 and 3 rotate.

If web 1 is to lay in uniformly in roll 3, the tension applied to it while it is being rolled up must be maintained substantially constant. The equipment shown in FIGURE 1 is for the purpose of tension control; it consists of a device 5 for drawing a loop 6 in the web, a light source 12a and a light responsive device 12b for measuring the dength of the loop in terms of an electrical signal, an amplifier 14 for amplifying the signal, a hydraulic regulator 20 for utilizing the amplified electrical signal to produce a hydraulic force varying in magnitude according to the signal, and a bypass valve assembly 70 for exercising some control over the hydraulic forces to the hydraulic actuator 10 which supplies the braking forces. The actuator illustrated is a simple hydraulic cylinder supplied with operating liquid from the regulator and having a reciprocating piston 24 connected to the brake shoe by means of a rod 25.

Loop forming device 5 may be a pair of rolls 11a, 11b spaced along the web transverse thereto and an intermediate wall 11. The rolls and the wall define a channel into which loop 6 is drawn by means of differential air pressure applied to the web as it passes over the rolls. A light beam from source 12a is projected onto the bottom surface of the loop at such an angle that some of the light striking the surface is reflected onto the light responsive device. Device 12b may be a group of solar cells connected together and to the amplifier through a coaxial cable 13, and the cells may be in an enclosure having a transparent wall facing the loop but otherwise opaque so as to exclude extraneous light. The electric signal obtained from the solar cells will represent the distance that the loop hangs down into the cavity, i.e., the curvature of the loop. Amplifier 14 may be one of the known high gain amplifiers; its function is to magnify the signal so it will be large enough for use in regulator 20.

The hydraulic regulator will now be described. This regulator is a relatively simple means for enlarging the signal from the amplifier sufficiently to render it useful for actuating a hydraulic cylinder in the braking mechanism. Regulator 20 converts the relatively small electrical output from the amplifier into a hydraulic force large enough to be applied directly to cylinder 10 wherein it acts on piston 24, causing the piston to exert thrust on brake shoe 8 via piston rod 25 in proportion to the hydraulic force.

In the hydraulic regulating equipment shown in FIGURE 1, a tank 26 contains a supply of hydraulic liquid 27. Since this equipment operates well with ordinary water, it will be described using water as the hydraulic liquid. A constant displacement pump 28 having its intake pipe 29 connected to a filter 30 submerged in the water and having its outlet pipe 31 connected to an adjustable flow-restricting valve 32 pumps water from the tank to cylinder 10 and accumulator 77 by way of pipe 31, valve 32, pipe 33, valve 71, and pipe 72, 75, 76. Hence, the pump delivers water from the tank directly to the cylinder, and the pressure of the water in the cylinder causes piston 24 to increase or decrease the braking effort according to the water pressure. For example, if the water pressure increases, the piston drives the brake shoe harder against the brake drum, and if the water pressure decreases, the piston relaxes the force of the brake shoe on the brake drum. The pressure of the water in pipe 31 is maintained relatively constant by means of relief valve 34 which is set to open at a definite pressure and allow water to return to the tank whenever the set pressure is exceeded. The regulator has been found to operate well at pressures around 60 p.s.i.g. in cylinder 10. Valve 35 is a safety valve placed in parallel with valve 34 and set to open at a pressure a little above the operating pressure of valve 34. This second valve is placed across the pump to protect it from damage due to excess pressure in the event that valve 34 fails to open at its set pressure. Since a preferred pump is one employing a worm and rubber casing, extra protection is desirable to prevent overstretching the rubber casing by abnormal pump pressures. When water is actually flowing from the pump to cylinder 10 and accumulator 77, its rate of flow can be restricted to a set value by adjusting the orifices in valves 32 and 71. Variations in the water pressure in cylinder 10 as required for brake control are effected by means of the electro-hydraulic device indicated by numeral 36 and now to be described.

Referring again to FIGURE 1, a small bore tube 38 is secured at its upper end to base 37 of device 36 by means of a clamp 39 such that the tube projects vertically downward from a stationary support. A pipe 40 connected to the upper end of tube 38 and to pipe 31 at a point between valves 32 and 34 conveys water under pressure from pipe 31 to tube 38; this water is then ejected in a small stream from the lower end 41 of tube 38 as a high velocity jet. Tube 38 may be a straight length of about 20 inches of small bore brass tubing hard and stiff enough that it has the properties of a spring. Whenever the lower end of the tube is deflected from the vertical attitude it normally assumes, it springs back to this normal position immediately the force causing deflection is removed. It is possible also to use a tube 38 having a relatively large bore by plugging the lower end 41 of the tube and forming a small orifice in the plug, e.g., drilling a small hole in the plug in axial alignment with the tube.

Located directly below the lower end 41 of tube 38 in axial alignment therewith is a relatively large cylinder 42 open at its lower end 47 and closed at its upper end by a wall 46 except for a small tubular portion 43 projecting upward from the end wall through a perforated horizontal wall 45. Preferably, tube 43 has an inside diameter about the same as that of tube 38, and when tube 38 is in its normal position the two tubes are aligned axially. Hence a fluid flow passage is provided from tube 38 into cylinder 42 through tube 43. Cylinder 42 is secured at its upper end wall to wall 45 such that the cylinder projects downwardly therefrom. Wall 45 is secured in a horizontal position inside a tank 44, and the tank is mounted on base 37. The tank has a cover 48 with a hole therein through which the lower end of tube 38 projects into the tank, the hole being large enough to not interfere with lateral movement of the end of the tube.

A large overflow pipe 49 placed nearly vertically has its lower end in tank 26 and its upper end in tank 44 spaced a little above the upper end of tube 43 and a little below cover 48. This pipe allows water to flow from tank 44 into tank 26, keeping the water in tank 44 at the level of the upper end of the pipe. An upright pipe 50 passing through the bottom wall of tank 44 connects the tank to pipe 33 so water can flow therefrom into the tank. This pipe is aligned axially with cylinder 42, and has an enlarged open mouth or orifice 51 at its upper end facing the open end of the cylinder with the orifice located a little below the lower edge 52 of the side wall of the cylinder as best shown in FIGURE 2. Orifice 51 has a smaller diameter than that of the inside of cylinder 42. pipe 50 allows water to flow virtually unobstructed from pipe 33 into tank 44 except for the piston 53 now to be described.

Piston 53 and the components co-operating therewith are best illustrated in FIGURE 2. The piston is a cylindrical member made of a light weight material such as a plastic, it fits loosely inside cylinder 42 and has a bottom surface 54 large enough to completely cover orifice 51. When the piston is seated on the orifice, it blocks the flow of water from the orifice, and when in other positions it restricts the flow according to the distance surface 54 is above the orifice. The piston is supported for reciprocation in the cylinder by a thin wall of water between the piston and the cylinder wall, that is, it floats in a vertical attitude inside an annulus of water between two stops, one of which is the upper cylindrical wall 46 and the other orifice 51. When the piston is in its uppermost position, it interferes very little with the flow of water from the orifice, but when in its lowermost position, it closes the orifice.

The control element for the hydraulic regulator is shown in FIGURES 1 and 2 as tube 38. This tube has its upper end fixed to base 37 such that the tube hangs in a normal position in axial alignment with tube 43, with its lower end 41 free to be deflected laterally from the normal position against the spring action of the tube. Armature coil 21 is linked mechanically with the lower end 41 of tube 38 such that when the coil is energized from amplifier 14, it exerts a force on the tube urging the lower end thereof to one side according to the magnitude and sense of the signal. By misaligning tube 38 with respect to tube 43, it is possible to alter the hydraulic forces in the brake cylinder 10 according to the magnitude of the electric signal from the amplifier. Coil 21 is the movable component of an electrodynamic device resembling a loud speaker; the device has a field electromagnet 59 energized from a D.C. source through leads 60, and is supported on base 37.

The operation of the regulating valve will now be described with reference to FIGURES 1 and 2. The pump is started, but before it will build up the water pressure in the regulating system, valve 32 must be at least partly closed, otherwise the water pumped into pipe 31 simply flows out of orifice 51 and back into tank 26 through overflow pipe 49 because no downward pressure has been developed on the piston; the piston is not restricting the flow of water from the orifice to allow the pressure to build up in the system. It is impossible to develop downward thrust of the piston until the pressure in pipe 31 is high enough to cause a jet stream of water to issue from the lower end of tube 38. Once the pressure builds up in pipe 31, water will flow therefrom through pipe 40 and tube 38, and be ejected from the end 41 of the tube at high velocity. So long as tube 38 is aligned with tube 43, as it will be when the valve is placed in operation, the stream of water will be directed into cylinder 42 by way of tube 43, and the force of the high velocity stream on the upper surface of the piston will drive the piston down onto orifice 51, thereby blocking or severely restricting the orifice. Once the jet has been established, valve 32 can be opened a predetermined amount because the jet will now hold the piston far enough down that it at least partially closes the orifice. The amount valve 32 is opened will have been determined at the time that the regulating valve was initially calibrated. It must be closed enough to create sufficient back pressure to prevent the system from being shut down on the first regulating swing, e.g., 30 to 60 p.s.i.g. back pressure when the regulating valve is set for operation on the 60 p.s.i.g. mentioned earlier. Before the regulating valve is placed in operation, the maximum pressure in pipes 31 and 33 will be set by adjusting valve 34 to readings shown on gauges 57 and 58. The pressures selected will depend on the characteristics of the regulating valve and its control function. As stated earlier, for the particular system described above, a maximum pressure of 60 p.s.i.g. in pipe 72 gives good results.

So long as tube 38 is in its normal undeflected position, i.e., aligned with tube 43, the downward force on the piston is maximum, and, as a result, the water flow from orifice 51 is minimum. When coil 21 is energized, it pulls the lower end of tube 38 to one side as indicated by arrow 62 in FIGURE 2, thereby diverting part of the jet away from the entrance 61 to tube 43; consequently, only a portion of the stream now exerts pressure on the water in cylinder 42. Reducing the stream of water to the cylinder reduces the downward force on the piston proportionately, allowing the piston to rise in the cylinder to a new position where the force of the jet on the upper surface of the piston is equal to the force of the water from the orifice on the lower surface of the piston. In rising, the piston allows more water to escape from the orifice. The water from both the orifice and the jet flows into tank 44, and from there back into tank 26 by way of the overflow pipe 49. The amount tube 38 is deflected from alignment with tube 43 depends on the strength of the electric signal supplied to coil 21, the stronger the signal the greater the deflection, and the greater the deflection the more water from the jet there is diverted away from the entrance to tube 43. This diversion of the jet is reflected on the downward force exerted on the piston, and the downward force on the piston determines its position with respect to the orifice and, consequently, the rate of water flow from the orifice. Hence the rate of water flow is directly related to the degree of misalignment of tubes 38 and 43, or to the magnitude of the electric signal, that is, the greater the signal the greater the flow from the orifice. When the signal energy in coil 21 drops to zero, tube 38 immediately springs back into alignment with tube 43.

An examination of FIGURE 1 will show that because of the throttling action of valve 32 the water pressure in cylinder 10 acting on piston 24 will decrease as the flow through orifice 51 increases. When the orifice is completely blocked by the piston, the pressure in cylinder 10 is about equal to that in pipe 31, and when the orifice is wide open, there will be little or no pressure in the brake cylinder. In practice, the regulator operates between these two extremes such that a very small electric signal applied to coil 21 controls a large hydraulic pressure in cylinder 10. This control is an inverse relationship wherein the pressure in cylinder 10 drops in response to an increase of signal energy. When no signal is applied to coil 21, the hydraulic pressure in cylinder 10 will be maximum and the thrust applied by piston 24 to brake shoe 8 will also be maximum; as the electric signal energy increases, the pressure in the cylinder decreases, relaxing the braking effort. A decrease in the electric signal energy increases the braking effort. Hence the regulator serves as a simple means for using a relatively small electric signal to control a relatively large braking mechanism.

Referring again to FIGURE 2, the small arrows indicate directions of water flow. At least a portion of the jet issuing from tube 38 is directed into tube 43, while the remainder is diverted to one side of tube 43, the splitting of the jet depending on the degree of misalignment of the tubes. The entrance 61 to tube 43 may have a sharp edge as shown so the split in the jet will be clean, thereby minimizing the loss of jet energy due to turbulence and splashing from the high velocity water striking the edge of the tube. Some of the water entering cylinder 42 through tube 43 is forced down between the cylinder wall and the piston and expelled at the lower edge 52 of the cylinder. Since considerable clearance is provided between the cylindrical wall and the piston, a significant volume of water will flow through this annular space, forming a thin wall of water supporting the piston without frictional interference from the wall of the cylinder. In a sense the piston floats inside this wall of water. The circumferential grooves 55 and 56 in the piston create flow turbulence and redistribute lateral fluid pressures around the cylinder such that the amount of water from the jet leaking past the piston is substantially less than the liberal piston clearance would otherwise permit.

Since the bore of cylinder 42 is made slightly larger than orifice 51, the light plastic piston continually finds an equilibrium position where the liquid pressure on its lower surface 54 is a small fixed percentage greater than the pressure exerted on its upper surface by the jet entering tube 43. In other words, when the piston comes to rest, the average hydraulic pressure on its upper and lower surfaces respectively will be the inverse of the internal diameters of parts 42 and 50. Since the average pressure on the lower surface of the piston is a little greater than the pressure on its upper surface, the piston provides pressure amplification greater than unity. The internal diameters of parts 42 and 50 may be varied over wide limits, but in the equipment described the ratio has been selected to approximately cancel out losses in the jet due to friction.

The bypass valve assembly 70 will now be described with reference to FIGURE 1. This assembly consists of a bi-directional flow restricting valve 71 connected between pipes 33 and 72 and shunted by a pair of relief valves 73 and 74 connected in parallel and to pipes 33 and 72. The assembly also includes an accumulator 77 which is connected to pipe 72 by way of pipe 76 such that a volume of water 78 can accumulate under a cushion of compressed air 79, its function being to take in or release water with fluctuations in system pressure.

During normal operation of the system the water flow in either direction between the regulator and the cylinder and accumulator is through pipes 33, 72, 75, 76 and valve 71. The purpose of valve 71 is to restrict this flow, and in so doing introduce significant time delays which have little affect on the system during normal operation other than rendering it very stable. When the working fluid is a liquid such as water, an accumulator is desirable in order to moderate the changes in flow through valve 71; with no accumulator, the flow would be off and on as piston 24 changes position because water is incompressible. Valve 71 may be a needle type valve which can be set manually for a rate of flow determined experimentally and depending on the accumulator because of its delaying influence on the system.

It can be readily seen that during normal operation of the system, the pressure drop across valve 71 is small; however, during transient conditions it can become relatively great because the regulator is now calling for a rapid change in pressure in cylinder 10 but the valve is actually holding back the flow of water between the regulator and the cylinder. If, for example, a transient causes the regulator to suddenly increase the pressure in pipe 33, valve 71 holds back the flow of water to the cylinder so it responds some time after the pressure increase. If, on the other hand, the transient causes a sudden decrease in pressure in pipe 33, valve 71 holds back the flow of water from the cylinder to the regulator, again delaying operation of piston 24. In holding back the flow, a relatively high pressure differential appears across valve 71, and it is this pressure differential which is used to open one of the relief valves 73 or 74 so the water can now flow freely between the regulator and cylinder. This in effect eliminates the time delay caused by restricting valve 71 during abnormal or transient conditions, temporarily converting a normally sluggish system into a fast acting system.

Preferably, valves 73 and 74 are the same kind of relief valves, and they are placed across valve 71 for flow in opposite directions as indicated by the arrows. This valve is a type which normally remains closed until the pressure differential across it of the appropriate sense reaches a set value, at which time the valve snaps fully open, allowing the fluid to flow freely through it; after the pressure falls to a predetermined value the valve closes again, completely cutting off the flow. Valves with these characteristics are well known. The type illustrated has a ball 80 biased against a seat 81 by means of a coil spring 82 placed in compression by the thumbscrew 83. The force that the spring applies to the ball urging it against its seat can be set by the thumbscrew so the valve opens at a preselected fluid pressure difference on the ball. The spring and the fluid presure inside the body of the valve urge the ball against its seat, while the fluid pressure inside the seat urges the ball away from its seat.

With a maximum pressure in cylinder 10 of about 60 p.s.i.g., good results have been obtained by having valves 73, 74 set to open at about 12 p.s.i.g. pressure differential. These pressure settings will, of course, vary from system to system, but in most cases the maximum pressure in the fluid actuator will be substantially greater than the pressures causing the relief valves to open. In most cases the two relief valves will be set to open at the same pressure, but there may be instances where it is advantageous to have them open at different pressures. Likewise, the closing pressures may be the same or different. It will be noted from FIGURE 1 that valve 73 opens and valve 74 remains closed when the pressure in pipe 33 exceeds that in pipe 72 by the amount necessary for valve opening, and vice versa when the pressure in pipe 72 exceeds that in pipe 33 by a like amount.

During transient conditions such as, for example, starting the web handling system, the regulator will call for fast action by the brake actuator, but its response will be delayed by valve 71 holding back the flow of fluid between the regulator and the actuator. This holding back of the fluid causes enough difference in pressure across the valve to open the appropriate relief valve, now allowing the fluid to flow freely. By passing valve 71 has the effect of eliminating the time delays caused by it. During this period, valves 73 and 74 will probably open or close alternately with oscillations in web tension as the system accelerates to full speed. Once operation of the system settles down to normal, valves 73 and 74 will remain closed and the delays introduced by 71 will stabilize operation.

In the practice of this invention, the effectiveness of relief valves 73, 73 can be enhanced through the gain of amplifier 14. This feature can be best illustrated through the use of a number hypothetical examples.

*Example 1*

Assume that the web handling system is an open loop regulating system having no gain and that relief valves 73, 74 remain closed for all differential pressures below 12 p.s.i.g. If the system pressure is zero and the pressure at regulator 20 now rises suddenly from 0 to 60 p.s.i.g., relief valve 73 opens immediately and remains open until the pressure in actuator 10 increases to 48 pounds, at which point the relief valve closes again because the pressure differential is now 12 pounds. Consequently, the pressure in the actuator increases suddenly to 48 p.s.i.g., that is, 12 pounds short of the 60 pounds called for by the regulator, and after that it increases slowly to 60 pounds. Hence the regulating system is very fast for the first 80% of this cycle and slow for the remaining 20%.

*Example 2*

Now assume that the pressure in both the regulator and actuator of Example 1 is 60 p.s.i.g. and a sudden change in web tension requires a decrease in actuator pressure to 50 p.s.i.g. to re-establish tension. With no amplification, this change in tension causes the regulator pressure to decrease to 50 p.s.i.g. Since the pressure differential between the regulator and the actuator is now only 10 pounds, relief valve 74 will not open; consequently, the adjustment in web tension will be made at the slow rate determined by flow restricting valve 71.

*Example 3*

Assume now that the web handling system is a closed loop regulating system having an amplifier 14 with a gain of three and that relief valves 73, 74 remain closed for all differential pressures below 12 p.s.i.g. Assume also that the pressure in both the regulator and actuator is 60 p.s.i.g. and that a sudden change in web tension requires a decrease in actuator pressure to 50 p.s.i.g. to re-establish tension. In other words, the electric signal obtained from the loop measuring device has a magnitude calling for a 16⅔% decrease in actuator pressure. This signal is multiplied in amplifier 14 by a factor of three so the signal fed to regulator 20 is now great enough to cause the regulator to decrease its pressure by 50%, that is, a decrease in regulator pressure from 60 to 30 p.s.i.g. Hence, there is now a 30 pound pressure differential between regulator 20 and actuator 10, and as a result, relief valve 74 opens so the fluid can flow freely from the actuator to the regulator until the pressure differential decreases to 12 p.s.i.g. Opening of valve 74 causes almost immediate response by the actuator in restoring tension, and as soon as restoration begins, the signal obtained from the loop measuring devices calls for an increase of regulator pressure. The restoration of tension to much nearer its desired value is now at the fast rate.

In Examples 1 and 2 there is no gain in the system, and although better than a system without the bypass valve assembly 70, full advantage is not taken of the assembly. By introducing an amplifier multiplier greater than one, it is possible to improve the performance of the bypass valve assembly considerably; the extent of this improvement will, of course, depend on the magnitude of the multiplier as illustrated in the third example.

Stability is necessary in a fluid regulating system of this kind. However, it is usually achieved at the expense of response time, and this leads to sluggishness of the system. Although sluggishness makes little difference to the system as long as operation is normal, it does harm the system at those times when fast response is wanted to cope with an abnormal condition of a transient nature. This invention introduces relatively long time delays into the fluid system so its operation will normally be very stable, and provides means for eliminating these long delays when fast response is needed. The system, therefore, offers the advantage of stability during normal operation and speed of response during abnormal transient operation.

What I claim as new and desire to secure by Letters Patent of the United States is:

1. A fluid regulating system adapted to be used in a controlled system comprising a fluid actuator; a fluid regulator for controlling the working fluid supplied to said actuator according to the requirements of the system controlled; a fluid flow circuit connecting said regulator to said actuator; a bi-directional flow valve in said circuit for restricting the flow of the fluid between the regulator and the actuator; a relief valve connected in said circuit across said flow restricting valve, said relief valve being normally closed and set to open at a predetermined pressure differential of one sense and when open providing an unrestricted fluid flow path around said flow restricting valve; and another relief valve connected in said circuit across said flow restricting valve, said other relief valve being normally closed and set to open at a predetermined pressure differential of the opposite sense and when open providing an unrestricted fluid flow path around said flow restricting valve.

2. A system for handling a pliable element such as a web of paper moving at high speed under controlled tension comprising driving means for advancing the element; braking means for resisting advancement of said element for applying tension thereto; a fluid actuator for supplying the braking force; means for measuring the tension in said element and producing a signal representing said tension; a fluid regulator responsive to said signal for controlling the working fluid for said actuator so as to maintain said tension relatively constant; a fluid flow circuit connecting said regulator to said actuator; a bi-directional flow valve in said circuit for restricting the flow of the fluid between the regulator and the actuator; a relief valve connected in said circuit across said flow restricting valve, said relief valve being normally closed and set to open at a predetermined pressure differential of one sense and when open providing an unrestricted fluid flow path around said flow restricting valve; and another relief valve connected in said circuit across said flow restricting valve, said other relief valve being normally closed and set to open at a predetermined pressure differential of the opposite sense and when open providing an unrestricted fluid flow path around said flow restricting valve, said flow restricting valve rendering said fluid system relatively slow and stable during normal operating conditions of the element handling system and said relief valves rendering said fluid system relatively fast during abnormal transient conditions.

3. The system defined in claim 2 wherein an amplifier is provided for enlarging the signal representing tension before it is applied to said fluid regulator.

4. The system defined in claim 1 wherein said fluid is a liquid and liquid accumulating means is connected in the circuit between the actuator and the bi-directional flow valve.

5. The system defined in claim 2 wherein said fluid is a liquid and liquid accumulating means is connected in the circuit between the actuator and the bi-directional flow valve.

6. The system defined in claim 3 wherein said fluid is a liquid, said actuator is a hydraulic cylinder, an accumulator is connected in the hydraulic line between the cylinder and the flow restricting valve, said amplifier is an electrical amplifier, and said signal is an electric signal.

References Cited

UNITED STATES PATENTS 3,266,376    8/1966    Eastcott et al. _____ 91—47

MARTIN P. SCHWADRON, *Primary Examiner.*

C. B. DORITY, JR., *Assistant Examiner.*